(No Model.) 2 Sheets—Sheet 1.

E. J. ARNOLD.
MACHINE FOR DROPPING DOUGH.

No. 560,885. Patented May 26, 1896.

WITNESSES.
Charles T. Hannigan
Lucy E. Green

INVENTOR.
Ernest J. Arnold
by James L. Jenks
Atty.

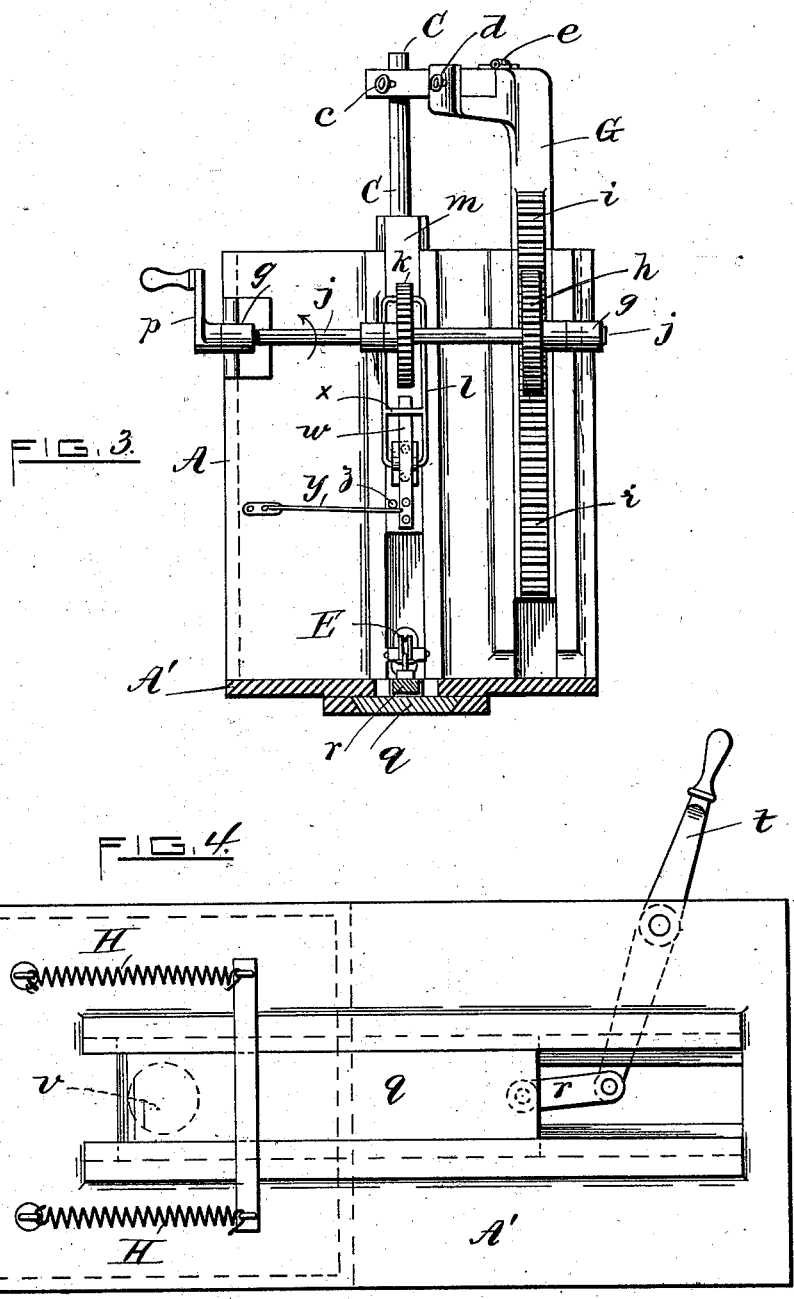

UNITED STATES PATENT OFFICE.

ERNEST J. ARNOLD, OF LONSDALE, RHODE ISLAND.

MACHINE FOR DROPPING DOUGH.

SPECIFICATION forming part of Letters Patent No. 560,885, dated May 26, 1896.

Application filed March 21, 1896. Serial No. 584,336. (No model.)

*To all whom it may concern:*

Be it known that I, ERNEST J. ARNOLD, a citizen of the United States, residing at Lonsdale, in the county of Providence and State of Rhode Island, have invented certain new and useful Improvements in Machines for Dropping Dough; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in dough-dropping machines for bakers' use in which the reservoir which holds the dough is provided with a plunger and an outlet controlled by a slide, both plunger and slide being actuated by the same lever; and the purpose of my invention is to provide a device by which any given quantity of dough can be dropped from the reservoir by each movement of the lever actuating the slide and plunger. I accomplish this purpose by the mechanism shown in the accompanying drawings, in which—

Figure 1:
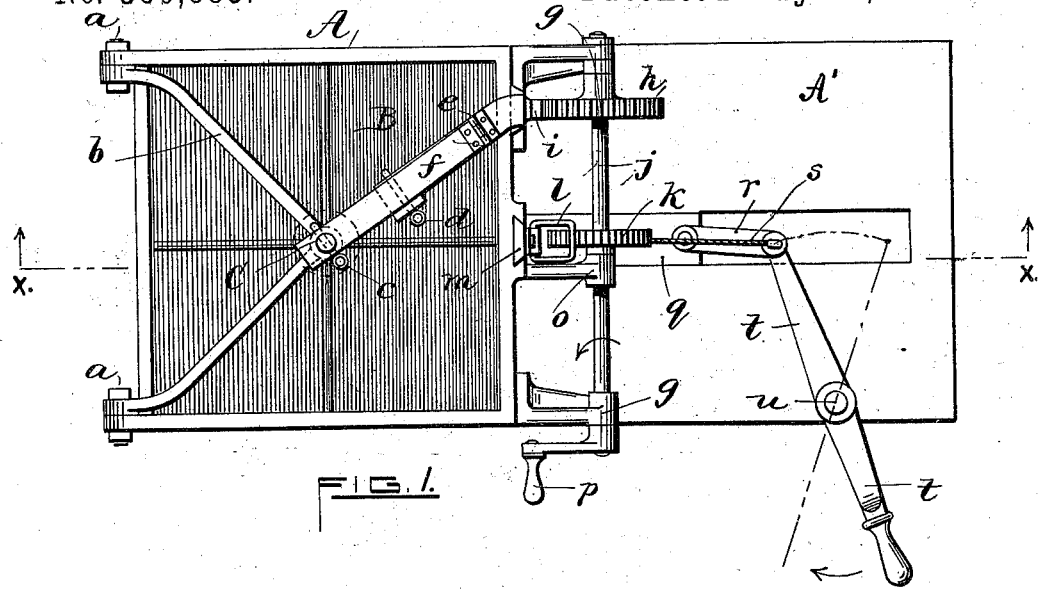
Figure 2:
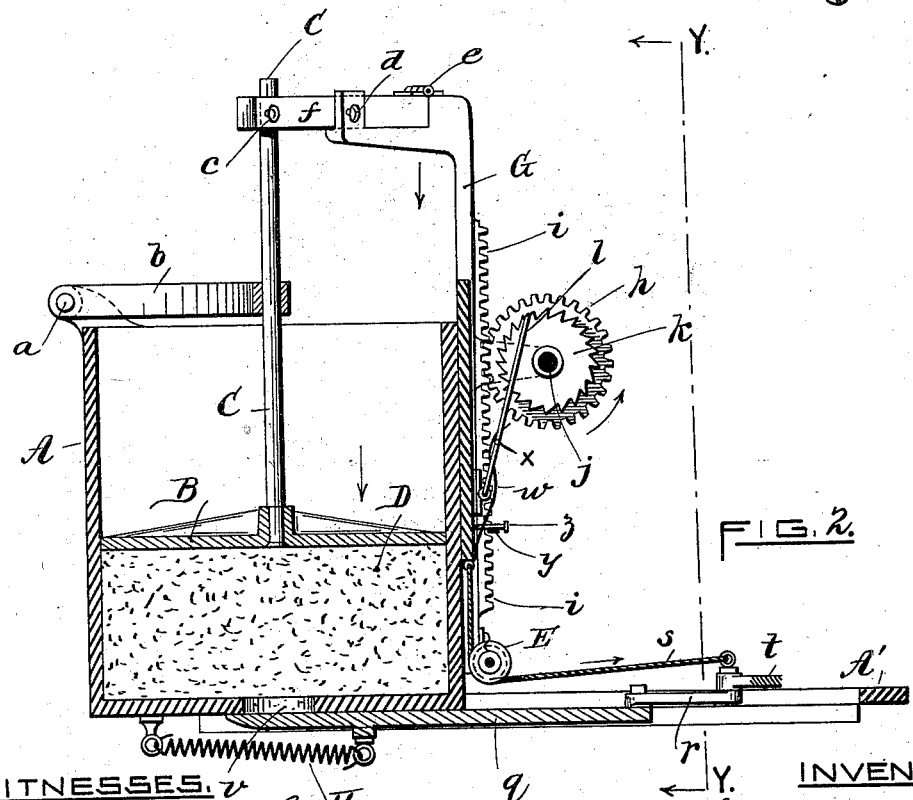

Figure 1 is a top plan view of my invention; Fig. 2, a vertical section through line X X of Fig. 1; Fig. 3, a vertical section through line Y Y of Fig. 2, and Fig. 4 a view of the bottom of the device.

The same parts are referred to by similar letters throughout the several views.

In Fig. 1, A is a square box-like reservoir having the plunger B fitting closely therein and the guide-rod C projecting upwardly therefrom, said guide-rod being kept in position throughout its movement by the arms $b$. Attached to the upper end of the guide-rod C is the arm $f$, hinged at $e$ and fastened to rod C by the pin $c$. Arm $f$ is supported by the upright bar G, Fig. 2, upon which is the rack $i$, engaging with the pinion $h$, mounted upon the shaft $j$, which revolves in the bearings $g$ $g$. Fixed upon this shaft is the crank $p$, by the revolution of which motion is communicated to the pinion $h$, and thus to the rack $i$ and upright bar G, thereby raising or lowering the arm $f$ and the plunger B. In the bottom of the reservoir A is a hole $v$, over which passes the slide $q$, which is used for opening or closing said hole $v$. Normally the hole $v$ is kept closed by the action of the springs H H upon slide $q$. (Seen best in Fig. 4.) $t\ t$, Fig. 1, is a lever pivoted at $u$ and connected by the link $r$ with the slide $q$. By the operation of this lever the slide is made to open or close the hole $v$. $d$, Fig. 2, is a pin which secures arm $f$ to the upright G when the plunger is being raised or lowered. At the end of the lever $t\ t$ farthest from the handle is the cord $s$, running over the pulley E (see Fig. 2) and connected with the slide $m$, the top view of which is seen in Fig. 1 and the front view in Fig. 3. To this slide $m$ is attached an open link $l$, pivoted at its lower end and engaging with its upper loop the ratchet-wheel $k$, which is fixed upon the shaft $j$. The spring $w$ keeps the link $l$ pressed against the ratchet-wheel $k$ by means of the cross-bar $x$. When the lever $t\ t$ is pulled in the direction of the arrow in Fig. 1, the slide $q$ is operated, opening the hole $v$, the cord $s$ at the same time by means of the link $l$ and the ratchet-wheel $k$ causing the shaft $j$ to make part of a revolution, thus depressing the plunger B by means of the rack $i$, the upright bar G, and the parts intermediate between said bar G and plunger B, and thus forcing a small portion of dough out through the hole $v$. The spiral springs H H then pull the slide $q$ back again, closing hole $v$. The slide $m$, to which is attached the link $l$, is at the same time raised to its former position by means of the spring $y$, pressing against the pin $z$ in said slide, and the machine is ready for another operation. The amount of dough discharged is determined entirely by the arc over which the handle $t$ moves, and this may be regulated by a movable pin (not shown) placed upon the bed-plate of the machine.

When it is desired to clean the machine after it is empty, the link $l$ is disengaged from the ratchet $k$ and the plunger is brought to the top of the reservoir by the crank $p$. The pins $c$ and $d$ are then withdrawn and the arm $f$ thrown back upon the hinge $e$. The arms $b$ are hinged at $a$ and may be thrown backward and the plunger entirely removed, so that the inside of the reservoir is easily accessible.

D in Fig. 2 represents the dough contained in the reservoir A, and A' in Figs. 2, 3, and 4 is the base or table of the machine.

By the use of a larger or smaller ratchet-wheel $k$ a larger or smaller quantity of dough may be dropped by each movement of the lever.

Having now described my invention, what I claim, and desire to secure by Letters Patent, is—

1. A dough-dropping machine for bakers' use, consisting of a reservoir with an aperture in the bottom thereof and a horizontal slide $q$ adapted to open and close said aperture; a plunger and guide-rod working within said reservoir; an upright bar connected with said guide-rod by a horizontal hinged arm, said bar being provided with a rack a pinion mounted upon a shaft fixed to the front of the said reservoir and engaging said rack; and means for operating said bar and said horizontal slide simultaneously.

2. A dough-dropping machine for bakers' use, consisting of a reservoir having an aperture at the bottom thereof and a horizontal slide $q$, provided with the springs H H, and adapted to open and close said reservoir; a plunger and guide-rod moving within said reservoir; an upright bar G connected to said guide-rod by a horizontal hinged arm; a rack fixed upon said upright bar; a pinion mounted upon a shaft fixed to the front of said reservoir, and engaging with said rack; a ratchet-wheel, also fixed upon said shaft; an open link engaging at its upper extremity with said ratchet-wheel, and at its lower extremity hinged upon the vertical slide $m$ and kept in position against the ratchet-wheel by the cross-bar $x$ and the spring $w$; a lever $t$ connected with said vertical slide by the cord $s$ and the pulley E, and also connected with the horizontal slide $q$ by the link $r$ so that the movement of said lever will operate the upright bar G and the horizontal slide $q$ simultaneously; and the spring $y$ operating to raise the slide $m$ when the lever $t$ is released, substantially as described and for the purpose specified.

In testimony whereof I affix my signature in presence of two witnesses.

ERNEST J. ARNOLD.

Witnesses:
EDWARD W. BLODGETT,
LUCY E. GREEN.